(12) United States Patent
Paulec et al.

(10) Patent No.: US 9,234,796 B1
(45) Date of Patent: Jan. 12, 2016

(54) LOW-RADIANCE INFRARED AIRBORNE CALIBRATION REFERENCE

(71) Applicant: The United States of America, as represented by the Secretary of the Navy, Washington, DC (US)

(72) Inventors: Mason David Paulec, Camarillo, CA (US); Jeffrey Brian Dieterich, Newbury Park, CA (US); Kenneth Howard Parker, Camarillo, CA (US); Kevin Michael Young, Camarillo, CA (US); Jack Ronald White, Camarillo, CA (US)

(73) Assignee: The United States of America as Represented by the Secretary of the Navy, Washington, DC (US)

( * ) Notice: Subject to any disclaimer, the term of this patent is extended or adjusted under 35 U.S.C. 154(b) by 63 days.

(21) Appl. No.: 14/294,443

(22) Filed: Jun. 3, 2014

Related U.S. Application Data

(60) Provisional application No. 61/833,665, filed on Jun. 11, 2013.

(51) Int. Cl.
*G01J 5/08* (2006.01)
*G01J 3/02* (2006.01)

(52) U.S. Cl.
CPC .................................... *G01J 3/0297* (2013.01)

(58) Field of Classification Search
CPC ..................................................... G01J 3/0297
See application file for complete search history.

(56) References Cited

PUBLICATIONS

Sun et al. Radiometric stability monitoring of the MODIS reflective solar bands using the Moon, Metrologia vol. 40 (Feb. 2003), pp. S85-S88.*

* cited by examiner

*Primary Examiner* — David Porta
*Assistant Examiner* — Shun Lee
(74) *Attorney, Agent, or Firm* — Christopher L. Blackburn; James M. Saunders; James W. Henson

(57) ABSTRACT

A low-radiance infrared airborne calibration reference is an infrared imaging and calibration method. The method includes positioning a mirror perpendicular to an optical axis of a focal plane array in both an open-face position and a mirror-reading position. Temperatures of a lens, window, and the mirror are determined. In-band radiance and offset is calculated to generate an adjusted calibration curve.

6 Claims, 7 Drawing Sheets

| | Mirror | Window | Lens | Detector | |
|---|---|---|---|---|---|
| 1 | | | $5.24e-5$ → <br> Lens emission in apparent radiance | $5.24e-5$ <br> Radiance seen by detector | W/cm2/sr |
| 2 | | $5.24e-5$ → <br> Window emission | $.95\tau$ → <br> Apply lens transmission loss | $4.98e-5$ <br> Radiance seen by detector | W/cm2/sr |
| 3 | $1.05e-5$ → <br> Mirror emission | $.95\tau$ → <br> Apply window transmission loss | $.95\tau$ → <br> Apply lens transmission loss | $9.47e-6$ <br> Radiance seen by detector | W/cm2/sr |
| 4 | $.99\rho$ ← <br> Apply mirror reflection → | $5.24e-5$ <br> Window emission <br> $.95\tau$ → <br> Apply window transmission loss | $.95\tau$ → <br> Apply lens transmission loss | $4.69e-5$ <br> Radiance seen by detector | W/cm2/sr |
| 5 | $.99\rho$ | ← $.95\tau$ ← <br> → $.95\tau$ → | $5.24e-5$ <br> → $.95\tau$ → | $4.46e-5$ <br> Radiance seen by detector | W/cm2/sr |
| 6 | $.99\rho$ | ← $.95\tau$ ← <br> → $.95\tau$ → | ← $.95\tau$ ← <br> → $.95\tau$ → | $2.64e-9$ <br> $1.70e-9$ <br> Radiance seen by detector | W/cm2/sr |

FIG. 9

LOW-RADIANCE INFRARED AIRBORNE CALIBRATION REFERENCE

CROSS-REFERENCE TO RELATED APPLICATIONS

This is a non-provisional application, claiming the benefit of parent provisional application number 61/833,665 filed on Jun. 11, 2013, whereby the entire disclosure of which is incorporated herein by reference.

STATEMENT REGARDING FEDERALLY SPONSORED RESEARCH OR DEVELOPMENT

The invention described herein may be manufactured and used by or for the government of the United States of America for governmental purposes without the payment of any royalties thereon or therefor. The subject matter of this invention is related to work conducted under contract N68936-11-0-0001.

FIELD OF THE INVENTION

Embodiments of the invention generally relate to calibration techniques.

BRIEF DESCRIPTION OF THE DRAWINGS

FIG. 9 illustrates an example in-band radiance values for six emission paths, according to some embodiments of the invention, and is depicted as reference character 90.

Figure 1:
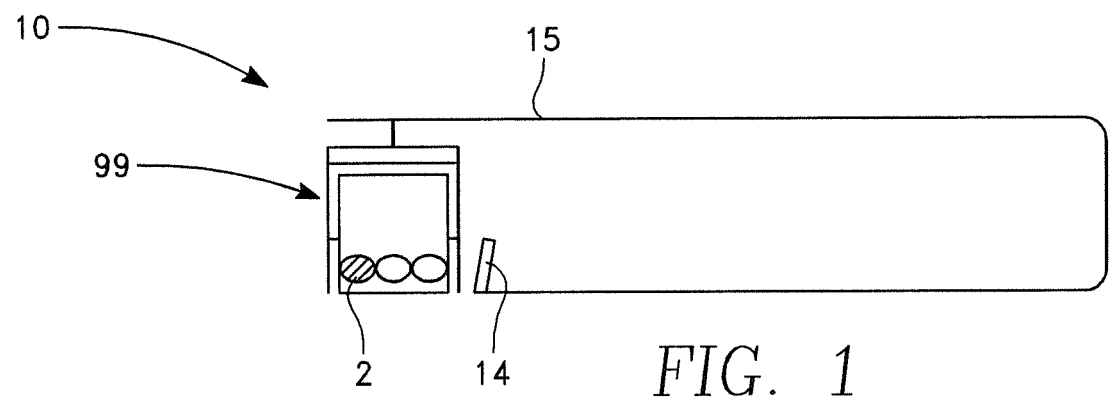
FIG. 1 illustrates a ball turret and measurement pod in an open-face position, according to some embodiments of the invention, and is depicted as reference character 10.
Figure 2:
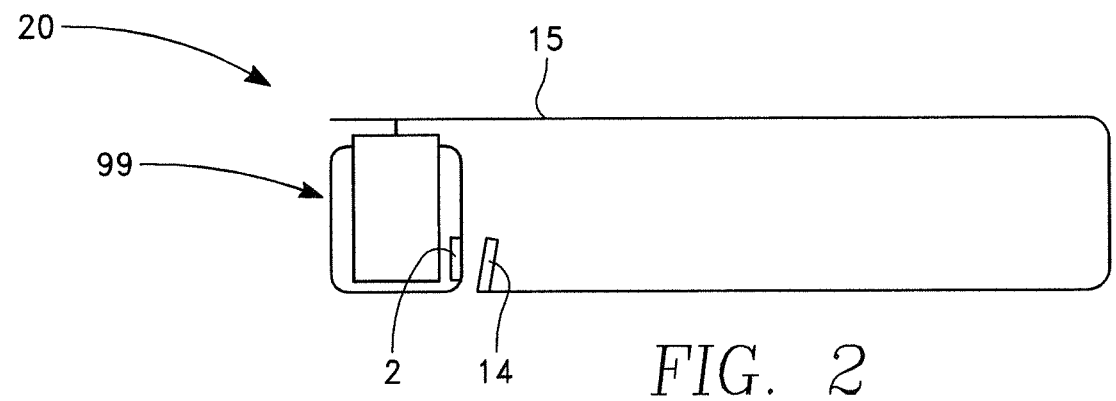
FIG. 2 illustrates a ball turret and measurement pod in a mirror-reading position, according to some embodiments of the invention, and is depicted as reference character 20.

It is to be understood that the foregoing general description and the following detailed description are exemplary and explanatory only and are not to be viewed as being restrictive of the invention, as claimed. Further advantages of this invention will be apparent after a review of the following detailed description of the disclosed embodiments, which are illustrated schematically in the accompanying drawings and in the appended claims.

DETAILED DESCRIPTION OF THE EMBODIMENTS OF THE INVENTION

Measurements of natural sky backgrounds at high altitude must be performed from an airborne platform at altitude to eliminate the atmospheric influence from viewing sky through a long path of dense, warm air by a ground-based sensor. Currently, the staring focal plane array imaging systems that are used to measure very low radiance levels drift significantly with the large changes in ambient temperature experienced in flight. Measurement with low uncertainty requires a calibrated radiation reference with a temperature low enough to provide a radiance level near that of the target and background to be measured.

Current infrared imaging systems use staring focal plane array detectors that are cryogenically cooled to function. The array is typically contained within a vacuum dewar filled with liquid Nitrogen. The temperature of the array is maintained at a constant 77 Kelvin by the boiling point of liquid Nitrogen at a pressure of one atmosphere.

Radiometric measurement of very low radiance levels of natural sky backgrounds at high altitude requires carriage of measuring instruments in or on another aircraft capable of flying at the test altitude. Measuring instruments are typically carried within a ball turret on one end of a testing pod. The instruments are calibrated in the laboratory, but large changes in ambient temperature in flight causes drift that needs to be compensated for by viewing a known, absolute calibration reference. Reference temperatures are ambient air temperature plus aerodynamic heating. Target and background equivalent radiance temperatures are substantially lower. This difference requires large extrapolation, with consequent uncertainty.

Embodiments of the invention provide a stable calibration reference at very low radiation levels in an airborne environment without consuming electrical power or occupying significant space or adding weight. Embodiments of the invention use the existing cold and stable detector array by positioning a high-quality front-surface mirror (near or) normal to the optical axis so the array sees a reflection of itself through the imager's lens and window. The result is a stable, very low-level calibration reference source that is compact and sufficiently rugged for airborne use.

Embodiments of the invention use the high-reflectivity front-surface mirror on the imager optical axis so the detector array sees a reflected image of itself. Because the array is located within a dewar of liquid Nitrogen, it is maintained at a stable 77 Kelvin (−196 C). The only uncompensated elements in the optical chain are direct emissions from the mirror (low because of high reflectivity), window, and lens (low because of high transmission). The mirror reference provides a radiance very near the lowest anticipated from the sky.

Although embodiments of the invention are described in considerable detail, including references to certain versions thereof, one skilled in the art would recognize that other versions are possible such as, for example, other component orientations. Therefore, the spirit and scope of the appended claims should not be limited to the description of versions described herein.

In the accompanying drawings, like reference numbers indicate like elements. For instance, reference character 99 is used to depict a ball turret, which may also be referred to as a "pod turret," "gimbal turret," "turret," or simply as a "housing," without detracting from the merits or generalities of embodiments of the invention. In each instance, the turret 99 is part of a testing/measurement pod 15, which is housed on an aircraft.

Temperature Measurement

Figure 8:
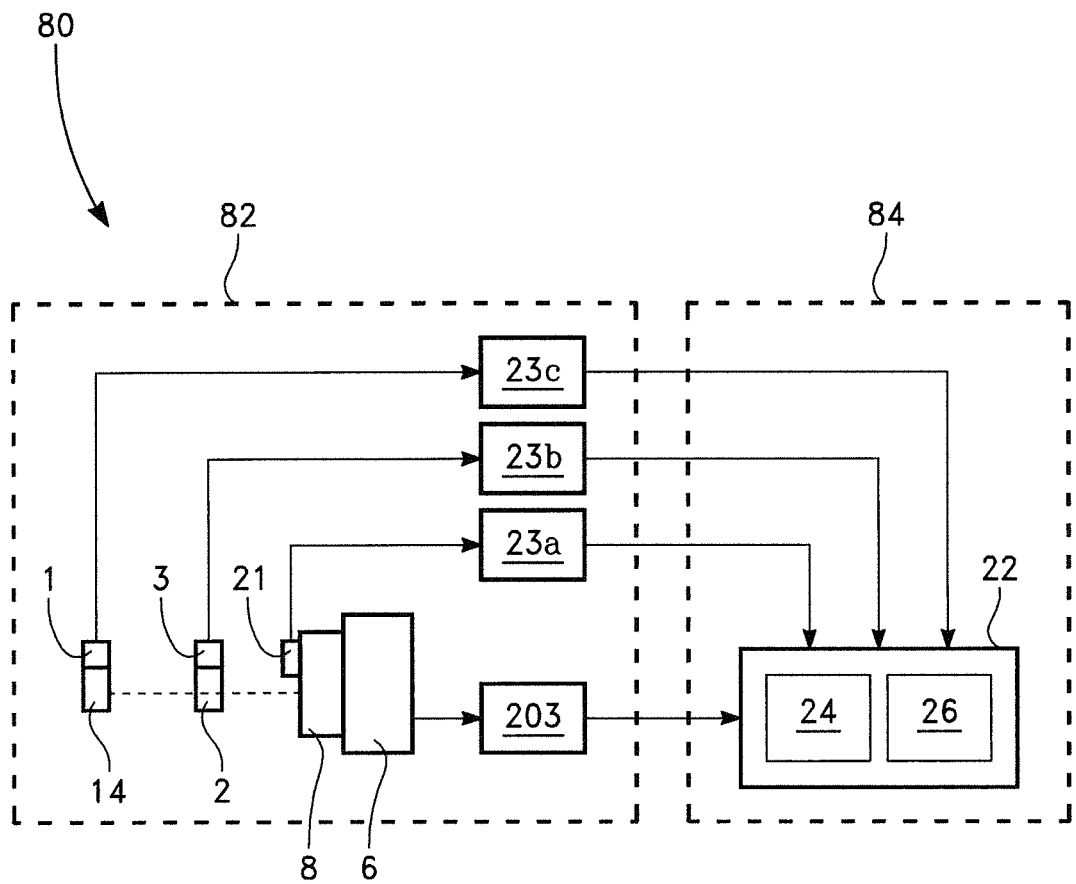
FIG. 8 illustrates embodiment components and electronic modules, according to some embodiments of the invention, and is depicted as reference character 80.

Temperature of the window 2, mirror 14, and lens 8 are monitored while calibration data is recorded. The temperature of the window 2 and lens 8 are monitored using any conventional temperature sensor(s). With reference to FIG. 8, in some embodiments, multiple temperature sensors 21 are attached to the lens 8, multiple temperature sensors 3 are attached to the window 2, and multiple sensors 1 are attached to the mirror 14. In some embodiments, the temperature sensors are platinum pt100 RTD (resistance temperature detector) attached to the different elements and thermistors (same idea as an RID but uses ceramics instead of platinum). The temperature data is recorded with time stamps so that it can be correlated to video. In some embodiments, the temperature data of the window 2 from the window temperature sensors 3 is time stamped and recorded in electronic memory 23b, the temperature data of the lens 8 from the lens temperature sensors 21 are time stamped and recorded in electronic memory 23a, and temperature data of the mirror 14 is time-stamped and recorded in electronic memory 23c.

Testing Pod

Figure 3:
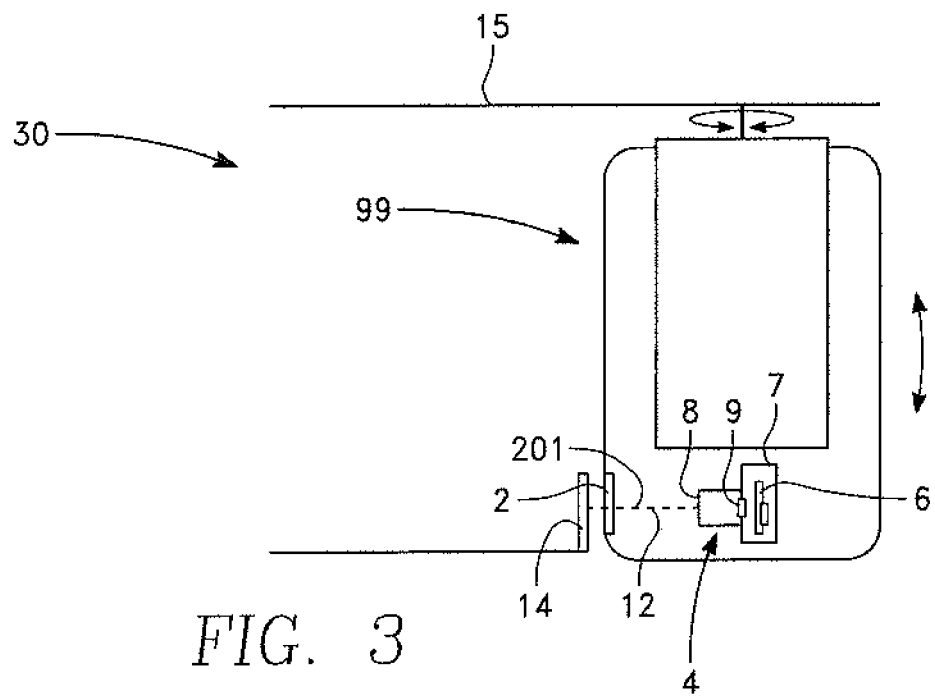
FIG. 3 illustrates a close-up view of a ball turret, measurement pod, and measurement components in a mirror-reading position with the mirror positioned perpendicularly to the measurement pod, according to some embodiments of the invention, and is depicted as reference character 30.
Figure 4:
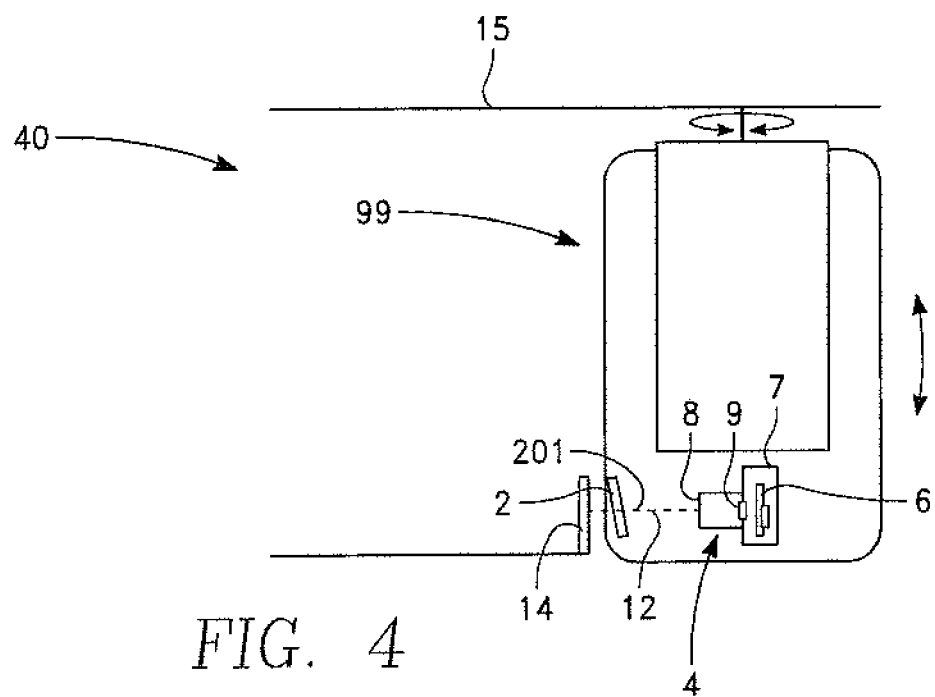
FIG. 4 illustrates a close-up view of a ball turret, measurement pod, and measurement components in a mirror-reading position with a window in a tilted orientation, according to some embodiments of the invention, and is depicted as reference character 40.

Measurement of individual signature components as function of aspect, wavelength, solar illumination, background, speed, engine power setting, and altitude requires a measurement platform capable of flying in close formation with a target. The testing pod 15 is depicted in FIGS. 1 through 7, and is a self-contained instrument and data acquisition system carried as an external store on various aircraft. The testing pod 15 includes the ball turret 99 in which various measurement instruments (including infrared cameras) are housed. FIGS. 3 & 4 generically depict (via arrows) pivoting and rotating movements of the turret 99. As such, the various measurement instruments (including infrared cameras) can move left/right and up/down.

Figure 5:
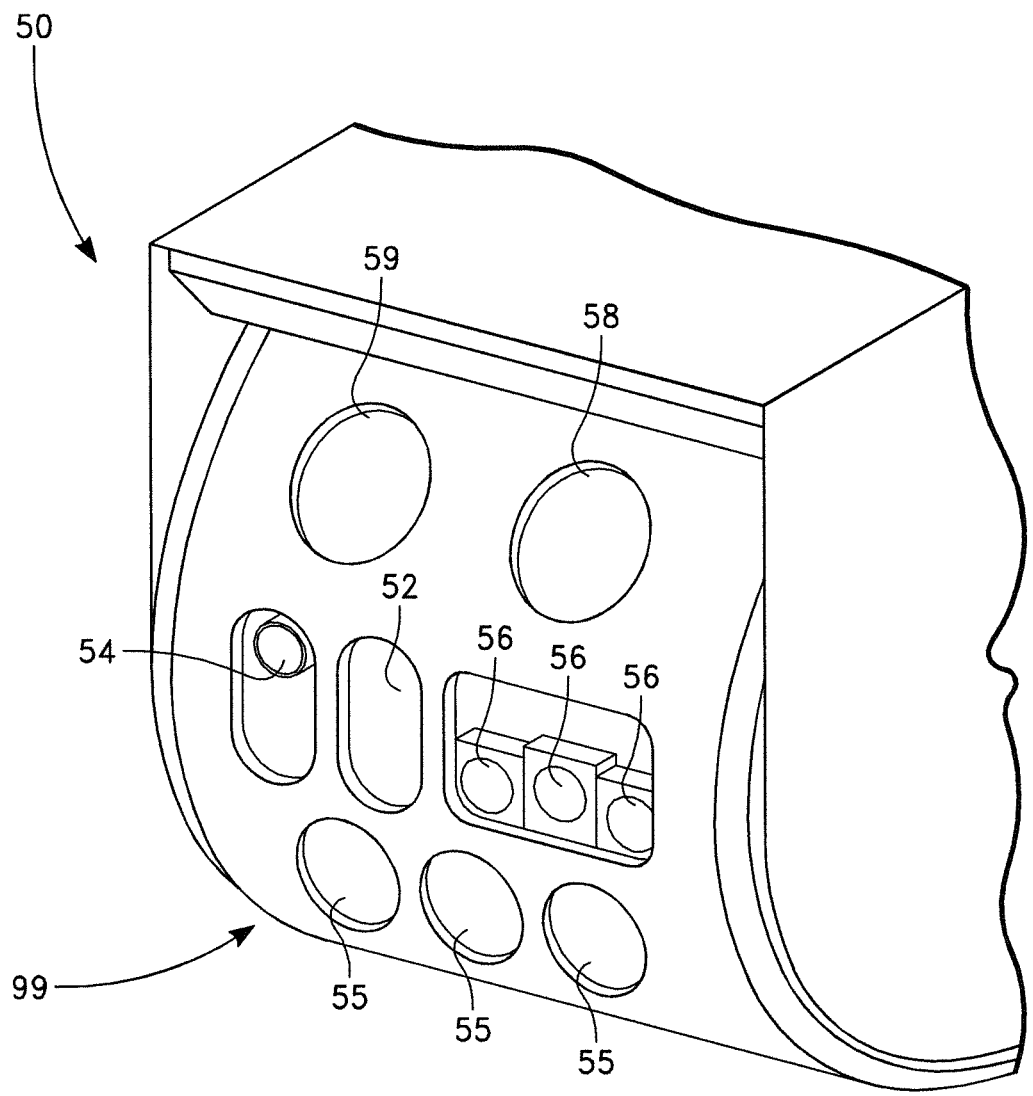
FIG. 5 is a close-up perspective view of a ball turret and measurement components, according to some embodiments of the invention, and is depicted as reference character 50.

With reference to FIG. 5, each infrared camera is disposed in the turret 99 such that its optical axis (the camera's optical axis 201—depicted in FIGS. 3, 4, 6, & 7) extends through an associated turret housing aperture 52. Each associated aperture 52 has an associated window of material having high transmissivity (>97%) and anti-reflective coatings. For reference, mid-wave infrared camera locations are shown as reference character 55. A laser range finder is depicted as reference character 54. Television (video) cameras are depicted as reference character 56. Reference characters 58 & 59 depict a spectrometer and long wave infrared (LWIR) camera locations, respectively. Other imaging components may also be included in the turret 99.

With reference to FIGS. 1 through 4 and 6 through 8, windows 2 covering associated turret housing apertures (52 in FIG. 5) are referred to using reference number 2. In some embodiments, windows 2 associated with long wave IR cameras 59 are formed of germanium coated with a conventional anti-reflection coating. In some embodiments, the windows 2 associated with the mid-wave IR cameras 55 are formed of silicon coated with conventional anti-reflection coating.

The pod turret 99 can be rotated so as to position its cameras in at least two positions—open faced position and minor-reading position. In an open-face position, the pod turret 99 is rotated such that the optical axis 201 does not intersect with any part of the testing pod 15 once through the camera's associated window. In this orientation, the cameras are able to image sky backgrounds 103 (FIG. 7). FIGS. 1 & 7 illustrate the turret 99 in open-faced position. FIGS. 2, 3, 4, & 6 illustrate the turret 99 in a minor-reading position. When in this position, the cameras are facing at an angle such that their optical axis 201 is nearly perpendicular to the reflective side of mirror (and passes through the detector lens 8 and associated window 2).

Figure 6:
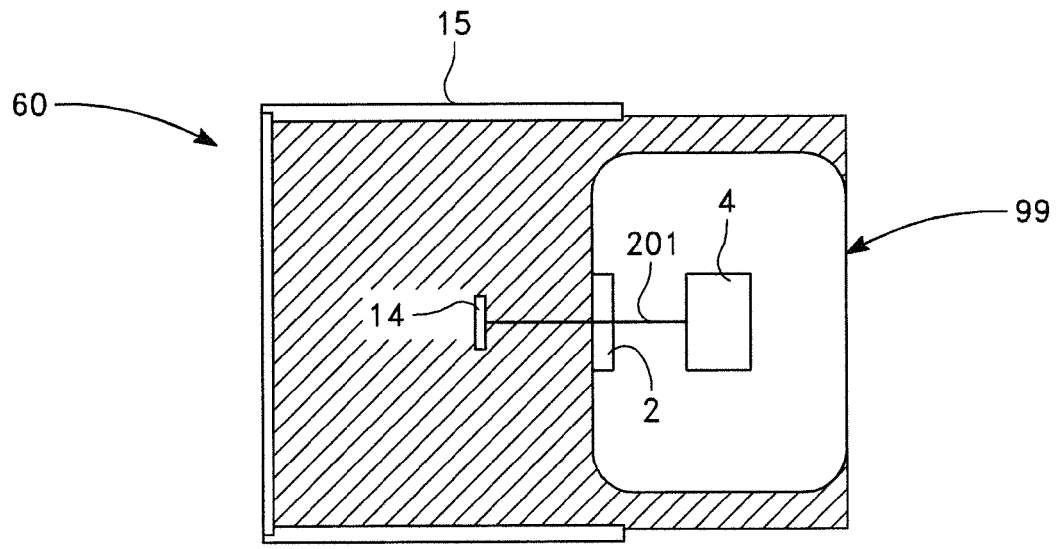
FIG. 6 illustrates a ball turret and measurement pod in a mirror reading position, according to some embodiments of the invention, and is depicted as reference character 60.
Figure 7:
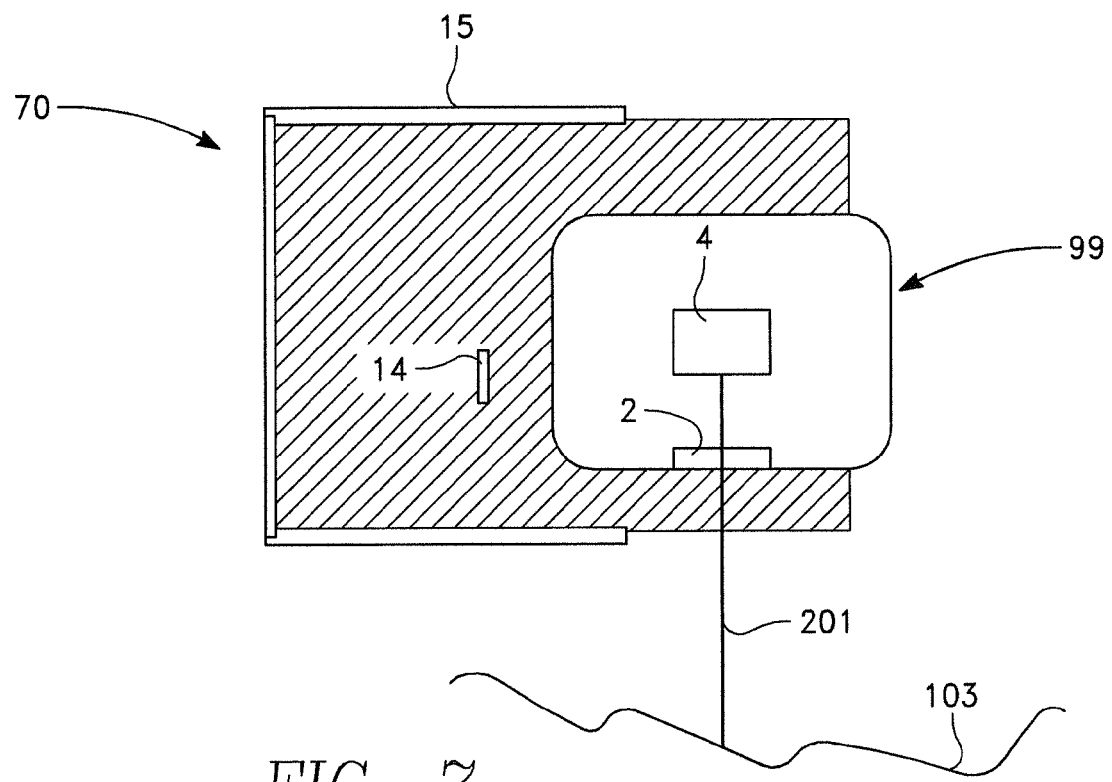
FIG. 7 illustrates a ball turret and measurement pod in an open-faced position and imaging the sky backgrounds, according to some embodiments of the invention, and is depicted as reference character 70.

In FIGS. 6 & 7, a shaded area is used to generically illustrate areas that are internal to the testing pod 15 body. Thus, FIGS. 6 & 7 generically show that other testing components exist inside the testing pod 15. The mirror 14, however, is outside the testing pod 15. Reference character 12 (FIGS. 3 & 4) depicts the reflection back from the mirror. For ease of viewing, the same dashed line is used for both reference characters 12 and 201 in FIGS. 3 & 4.

IR Camera Assemblies

With reference to FIGS. 3 & 4, as used herein, IR cameras are staring focal plane imagers 4 formed of a lens 8 and a staring array 6 having a plurality of pixels/counts. A staring array, staring-plane array, focal-plane array ("FPA" or "detector array"), or focal-plane is an image sensing device consisting of an array (typically rectangular) of light-sensing pixels/counts at the focal plane of a lens 8. FPAs are used most commonly for imaging purposes (e.g. taking pictures or video imagery). Any known infrared staring array can be used. In some embodiments, the detector arrays 6 are formed of photodetectors such as for example: indium antimonide (3-5 μm), indium arsenide, mercury cadmium, telluride (MCT) (1-2 μm, 3-5 μm, 8-12 μm), lead sulfide, lead selenide.

FPAs operate by detecting photons at particular wavelengths and then generating an electrical charge, voltage, or resistance in relation to the number of photons detected at each pixel/count. In conventional imaging systems, this charge, voltage, or resistance is then measured, digitized, and used to construct an image of the object, scene, or phenomenon that emitted the photons.

The staring array 6 is cryogenically cooled in a vacuum-sealed case or Dewar. An IR camera assembly, as used herein, includes a lens 8 (which may include multiple optical elements), a staring array 6, a liquid dewar case 7 configured to receive staring array 6, and a window 9 isolating the vacuumed dewar from the environment (and which resides in the optical path of the detector array).

Mirror

With reference to FIGS. 1 through 4 and 6 through 8, embodiments employ a high reflectivity mirror 14. As used herein, the term mirror describes a high (>98%) reflectivity front-surface plane mirror having a planar reflective surface over the infrared portion of the spectrum (~2-12 micrometers). For light rays striking a plane mirror, the angle of reflection equals the angle of incidence. The angle of incidence is the angle between the incident ray and the surface normal (an imaginary line perpendicular to the surface). Therefore the angle of reflection is the angle between the reflected ray and the normal and a collimated beam of light does not spread out after reflection from a plane mirror, except for diffraction effects. In some embodiments, mirror 14 is circular (with a 4 inch diameter and about ¼ inch thick) and formed of copper-substrate and a protected silver coating.

System and Method Embodiments

We now turn to a description of the system and method embodiments. System and method embodiments include a plane array disposed in liquid dewar within a housing. The optical axis 201 of the focal plane array is oriented such that its optical axis 201 passes through its associated window.

Embodiments include providing/generating a laboratory-generated calibration curve for staring focal plane imager 4, wherein the staring focal plane imager 4 includes a lens 8 and a focal plane array 6 having a plurality of pixels/counts. The laboratory-generated calibration curve relates a value of each of the counts to a radiance value for the staring focal plane imager. In some embodiments, the calibration curve is generated using any known or conventional calibration technique. In other embodiments, however, the imager calibration curve is generated using Black Body Sources ranging from −40 C to 100 C (for the most sensitive integration time) in 10 C increments. Between each one of these measurements, a reference at 20 C is employed to track any changes in ambient conditions in the lab. The window and lens are included in the calibration and lab temperature is usually about 23 C to 24 C. In these embodiments, calibration is performed in a nitrogen purged environment to eliminate atmospheric effects on the calibration. In some embodiments, the calibrations are performed with the imager and optics at −20 C by incorporating a temperature chamber into the setup. This data point tells us that the Imager maintains the same gain as the ambient temperature varies. This point is key to using a single point in flight to determine the offset term.

Embodiments include positioning a mirror 14 outside of the gimbal turret 99 a pre-determined distance away from the lens 8. A range of suitable distances of the mirror 14 from the lens 8 include from about 1 inch to about 12 inches, although other distances may also be appropriate based on application-specific conditions. The mirror 14 is disposed such that its front-surface plane is near perpendicular (within +/−1 degree) to the optical axis 201 of the focal plane array when the gimbal turret 99 is in a first closed-faced position. The mirror 14 is hard-mounted outside of the turret 99 and testing pod 15 and in the airstream. Embodiments include orienting gimbal turret 99 in first closed-face position.

In FIG. 8, reference character 82 represents the individual components portion of some embodiments of the invention, as well as some of the particular associations of the components with each other. Reference character 84 represents the calculation portion of embodiments of the invention. Embodiments include measuring the temperature of mirror 14, lens 8 and window 2 at a first point in time (with the turret 99 oriented in first closed-face position). The temperature of lens 8, window 2, and mirror 14 are time stamped and recorded in electronic memory (in some embodiments, individual electronic memory elements 23a, 23b, and 23c, respectively).

Embodiments include taking a digital image using the focal plane image 4 at the first point in time at the first position. Although the camera is not entirely isolated from radiance contributions originating from the environment outside the pod 15, the camera is sufficiently isolated such that any contributions from the environment outside the pod are third order.

The image is in the form of voltage values (voltage per pixel) produced by the detector array in response to being irradiated with radiation at the first point in time. The voltage values represent the voltage response of pixels of the detector array 6 to the irradiation over the spectral response of the detector 6 at the first point in time. The output voltage value is in the form of a voltage per pixel 16 and is converted to a count value using an analog to digital converter (which is either co-located in the dewar case or outside the dewar case). The count value is recorded in electronic memory 203 along with a time stamp that allows the count values to be correlated to the temperature of the mirror 14, lens 8, and window 2 when the voltage value is generated, such as at the first point in time.

Embodiments include orienting the turret 99 to a second position (open-face position) during the flight. Embodiments include recording digital imagery of natural sky background at a second point in time (at the second position) during the flight using imager 4.

Embodiments include calculating an in-band radiance of imager 4 at the first point in time using the temperature of the mirror 14, window 2, and lens 8 along with the known material properties according to Planck's law over the spectral response of the imager.

Planck's law describes the spectral distribution of radiant power as a function of temperature. Below is Planck's 1909 formula for what he referred to as spectral intensity, which is different from the way that intensity is defined today. Planck's formula is:

$$E_\lambda = \frac{hc^2}{\lambda^5} \frac{1}{\left(e^{\frac{ch}{\lambda kT}} - 1\right)}.$$

For aircraft applications, Planck's formula is commonly modified to include a term for emissivity, several of the constants are combined, and units of length are converted to convenient forms for wavelength and area, thus yielding the following equation, $$L_\lambda = \epsilon \frac{a}{\lambda^5} \frac{1}{\left(e^{\frac{b}{\lambda T}} - 1\right)},$$

where:
$L_\lambda$=spectral radiance (W·cm$^{-2}$·sr$^{-1}$·μm$^{-1}$);
$\epsilon$=emissivity (0 to 1.0, often assumed to be 1 in Planck's formula);
h=Planck's constant (6.62606957×10$^{-34}$ W·s$^2$);
c=speed of light (2.99792458×10$^{10}$ cm·s$^{-1}$);
k=Boltzmann's constant (1.3806488×10$^{-23}$ J·K$^{-1}$);
λ=wavelength (μm);
T=absolute temperature (K);
a=(10$^{16}$)2hc$^2$ (1.19042868×10$^4$ w·cm$^{-2}$·μm$^4$); and
b=(10$^4$)ch/k (1.43877696×10$^4$ μm·K).

For example, consider the hypothetical contemplated in Table 1 with the mirror 14, window 2, and lens 8 at −20 C at the first point in time (and the detector 6 at a dewar controlled constant temperature of −196 C) over the spectral response of the image (about 7.8 to 10.8 microns). The optical properties (emissivity, reflectance, and transmissivity) of the mirror 14 at its temperature is known via conventional measurement. The emissivity of the detector is taken to be equal to 1. Note that the window 2 and lens 8 components have a small reflection component. It is minimized by the Anti-Reflective coatings on them, but is not actually 0. However, because of the setup of the instrument and optical elements during measurements, all of the sources of radiant energy that could be reflected are approximately the same temperature as the window 2 and lens 8. This results in the ability to account for the reflection component by including it in the emissivity value.

Note that for the purposes of this application, the lens 8 is deemed to be the composite of the lens optical components in combination with the detector window. The composite transmissivity of the composite lens is determined using a tunable monochrometer with the lens optical components installed on the camera detector 6 so that the optical components of the lens 8 are axially-aligned with the camera optical axis 201 and the detector window 2. In the example, the composite transmissivity is measured to be 0.95. The emissivity of the lens is then taken to be 1−(measured transmissivity) which, in this case, is 1−0.95=0.05.

Somewhat similarly, the emissivity of the window 2 is determined by measuring the transmissivity of the window using a Fourier Transform Infrared (FTIR) spectrophotometer. The emissivity is then taken to be 1−(measured transmissivity)—in this case 1−0.95=0.05.

TABLE 1

Prophetic Example

| | Mirror | Window | Lens | Detector |
|---|---|---|---|---|
| Temperature | −20 C. | −20 C. | −20 C. | −196 C. |
| Emissivity | 0.01 | 0.05 | 0.05 | 1 |
| Reflectance | 0.99 | 0 | 0 | 0 |
| Transmission | 0 | 0.95 | 0.95 | 0 |
| Emission Component | 1.05E−5 | 5.24E−5 | 5.24E−5 | 2.64E−9 |

More specifically, an in-band radiance value of the camera due to the radiation at the first point in time is calculated as the sum of:
  an emission component of the lens (8) at the first temperature;
  an emission component of the window (2) at the second temperature times a lens transmission coefficient of the lens at the first temperature;
  an emission component of the mirror (14) at the third temperature times a window transmission coefficient at the second temperature times the lens transmission coefficient at the first temperature;
  the emission component of the window at the second temperature times a mirror reflectance coefficient times the window transmission coefficient times the lens transmission coefficient;
  the emission component of the lens times the window transmission coefficient times the mirror reflection coefficient times the window transmission coefficient times the lens transmission coefficient; and
  an emission component of the detector times the lens transmission coefficient times the window transmission coefficient times the mirror reflection coefficient times the lens reflection coefficient.

With reference to FIG. 9, using the hypothetical values in Table 1, the in-band radiance value (or in-band radiance per pixel) of the camera at the first point in time ($2.03 \times 10^{-4}$) W/cm²/sr would be the sum of:
  emission component of the lens at the first temperature ($5.24 \times 10^{-5}$) W/cm²/sr (row 1);
  emission component of the window at the second temperature ($5.24 \times 10^{-5}$) times a lens transmission coefficient at the first temperature ($0.95$)=$4.98 \times 10^{-5}$ W/cm²/sr (row 2);
  an emission component of the mirror at third temperature ($1.05 \times 10^{-5}$) times a window transmission coefficient at the second temperature ($0.95$) times lens transmission coefficient at first temperature ($0.95$)=$9.47 \times 10^{-6}$ W/cm²/sr (row 3);
  emission component of the window at the second temperature ($5.24 \times 10^{-5}$) times a mirror reflectance coefficient ($0.99$) times the window transmission coefficient ($0.95$) times the lens transmission coefficient ($0.95$)=$4.69 \times 10^{-5}$ W/cm²/sr (row 4);
  emission component of the lens at the first temperature ($5.24 \times 10^{-5}$) times window transmission coefficient ($0.95$) times mirror reflection coefficient ($0.99$) times window transmission coefficient ($0.95$) times lens transmission coefficient ($0.95$)=$4.46 \times 10^{-5}$ W/cm²/sr (row 5); and
  emission component of the detector at cryogenic temperature ($2.64 \times 10^{-9}$) times lens transmission coefficient ($0.95$) times window transmission coefficient ($0.95$) times mirror reflection coefficient ($0.99$) times window transmission coefficient ($0.95$) times lens transmission coefficient ($0.95$)=$1.70 \times 10^{-9}$ W/cm²/sr (row 6).

FIG. 9 shows six possible emission paths. The emission paths can be determined by reference to a particular row and following the depicted arrows. Thus, in row 1, the lens emits directly to the detector. In row 2, the window emits through the lens to the detector. In row 3, the mirror emits through the window, through the lens, and then to the detector. In row 4, the window emission reflects off the mirror, back through the window, through the lens, and to the detector. In row 5, the lens emits through the window, reflects off the mirror, then proceeds back through the window, through the lens, and then to the detector. Finally, in row 6, the detector emits through the lens, through the window, reflects off the mirror, then proceeds through the window, through the lens, and then back to the detector.

At the lab, the portion of the image (generated by the detector array 4 at the first point in time) that provides a uniform source (within a typical standard deviation of a uniform source) is identified. This portion is used to calculate an average count value for the detector 4 at the first point in time (the average count value within the optically resolved region is determined and taken to be the average count value for the first point in time). Identifying the portion of the image at the first point in time that provides a uniform source is done using conventional techniques.

Reference character 22 (FIG. 8) is used to depict the calculation modules for embodiments of the invention. Module 24 calculates the radiance per pixel of the camera. Once the radiance per pixel of the camera at the first point in time is calculated, module 26 calculates the offset of focal plane image with the lens 8 at the first temperature, the window 2 at the second temperature, and the mirror 14 at the third temperature from the radiance per pixel according to the equation below. In the equation, m is equal to the slope of the laboratory-generated calibration curve, x is the average count value at the first point in time, and y is equal to the calculated radiance per pixel at the first point in time. Thus, the offset is defined as: offset=y−m×x.

Figure 10:
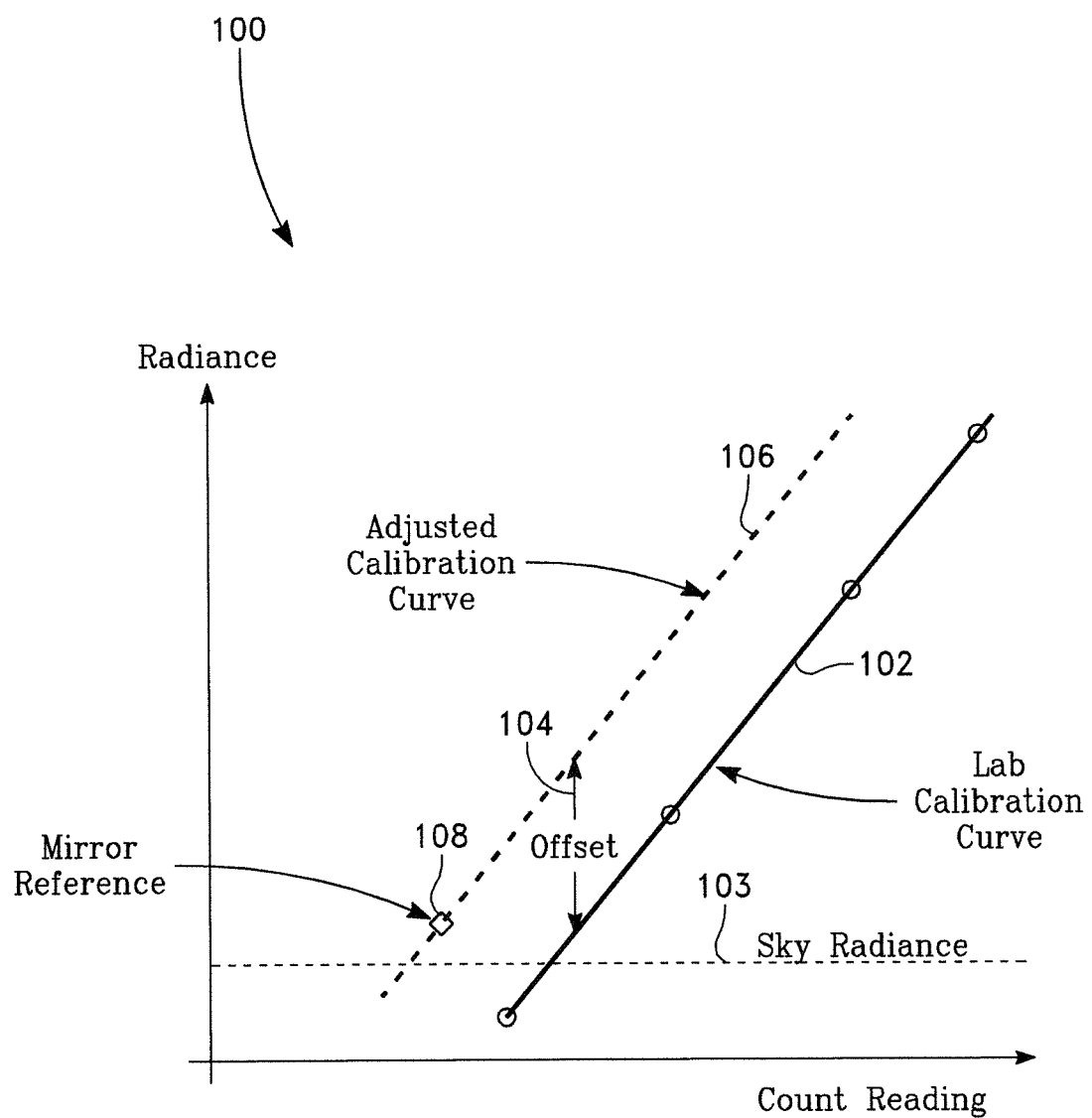
FIG. 10 illustrates a lab-generated calibration curve adjusted according to the offset to produce an adjusted calibration curve, according to some embodiments of the invention, and is depicted as reference character 100.

Embodiments of the invention include generating an adjusted calibration curve. FIG. 10 depicts the adjusted calibration curve by adjusting the laboratory-generated calibration curve an amount equal to the offset. Likewise, embodiments include assigning radiance values to count values of the digital imagery according to the adjusted calibration curve using conventional techniques. A lab-generated calibration curve 102 adjusted according to the offset 104 to produce an adjusted calibration curve 106. The lowest anticipated radiance is from the clear sky background 103. The mirror reflection (mirror reference) 108 provides a reference level very close to the sky.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

What is claimed is:

1. An infrared imaging, and calibration method, comprising:
- providing a laboratory-generated calibration curve for a staring focal plane imager, wherein said staring focal plane imager includes a lens and detector array having a plurality of counts, wherein said laboratory-generated calibration curve relates a value of each of said plurality of counts to a radiance value for said staring focal plane imager;
- disposing said detector array in a liquid nitrogen Dewar in a housing having an exterior aperture and associated window, wherein an optical axis of said detector array passes through said window;
- positioning a mirror outside of said housing a pre-determined distance away from said lens in an orientation perpendicular to said optical axis of said detector array when said housing is in a first position;
- orienting said housing in said first position during a flight;
- determining a first temperature, said first temperature corresponding to a temperature of said lens at a first point in time during said flight with said housing in said first position said lens associated with a lens transmission coefficient at said first temperature;
- determining a second temperature, said second temperature corresponding to a temperature of said window at said first point in time during said flight with said housing in said first position, said window associated with a window transmission coefficient at said second temperature;
- determining a third temperature, said third temperature corresponding to a temperature of said mirror at said first point in time during said flight with said housing in said first position, said mirror associated with a mirror reflectance coefficient at said third temperature;
- irradiating said detector array with radiation, wherein said radiation comprises radiation emitted from said lens, said window, said detector array, and said mirror;
- recording a count value representing said response of said detector array to said radiation over the spectral response of said detector at said first point in time;
- orienting said housing to a second position during said flight;
- recording digital imagery using said detector array in said second position during said flight, wherein said digital imagery is of natural sky background;
- calculating an in-band radiance value of said detector array due to said radiation at said first point in time as the sum of:
  - and emission component of said lens;
  - an emission component of said window times said lens transmission coefficient;
  - an emission component of said mirror times said window transmission coefficient times said lens transmission coefficient;
  - said emission component of said window times said mirror reflectance coefficient times said window transmission coefficient times said lens transmission coefficient;
  - said emission component of said lens times said window transmission coefficient times said mirror reflectance coefficient times said window transmission coefficient times said lens transmission coefficient;
  - an emission component of said detector array at a cryogenic temperature times said lens transmission coefficient times said window transmission coefficient times said mirror reflectance coefficient times said window transmission coefficient times said lens transmission coefficient;
- calculating an offset of said focal plane imager at said first point in time, where said offset is mathematically defined as follows, where m is equal to slope of said laboratory-generated calibration curve, x is an average of said count value, and y is equal to said in-band radiance value: offset=y−mx;
- generating an adjusted calibration curve by adjusting said laboratory-generated calibration curve an amount equal to said offset; and
- assigning radiance values to count values of said digital imagery according to said adjusted calibration curve.

2. The method according to claim 1, wherein said pre-determined distance of said mirror from said lens is about 8 inches.

3. The method according to claim 1, wherein said pre-determined distance of said mirror from said lens is a range of about 1 inch to about 12 inches.

4. And infrared imaging and calibration method, comprising:
- providing a laboratory-generated calibration curve for a focal plane imager, wherein said focal plane imager includes a lens and a detector array having a plurality of counts, wherein said laboratory-generated calibration curve relates a value of each of said plurality of counts to a radiance value for said focal plane imager;
- disposing said detector array in a liquid nitrogen Dewar to a housing having an exterior aperture and associated window, wherein an optical axis of said detector array passes through said window;
- positioning a mirror a pre-determined distance away from said lens, wherein said mirror is oriented perpendicular to said optical axis of said detector array when said detector array, said window, and said mirror are in a first position; wherein said lens and said window are the only elements that lie in the detector array's optical axis between said detector array and said mirror when in said first position;
- orienting said mirror, said detector array, and said window in said first position during a flight;
- determining a first temperature, said first temperature corresponding to a temperature of said lens at a first point in time during said flight when in said first position, said lens associated with a lens transmission coefficient at said. first temperature;
- determining a second temperature, said second temperature corresponding to a temperature of said window at said first point in time during said flight when in said first position, said window associated with a window transmission coefficient at said second temperature;
- determining a third temperature, said third temperature corresponding to a temperature of said mirror at said first point in time during said flight when in said first position, said mirror associated with a mirror reflectance coefficient at said third temperature;
- taking an image using said focal plane imager at said first point in time when in said first position;
- recording a count value representing said response of said detector array to radiation over the spectral response of said detector array at said first point in time when in said first position;
- orienting said detector array and said window in a second position during said flight, wherein said mirror is excluded from an optical path of said detector array;

recording digital imagery using said focal plane imager in said second position during said flight, wherein said digital imagery is of natural sky background;

calculating an in-band radiance value of said focal plane imager due to said radiation at said first point in time as the sum of:
- an emission component of said lens;
- an emission component of said window times said lens transmission coefficient;
- an emission component of said mirror times said window transmission coefficient times said lens transmission coefficient;
- said emission component of said window times said mirror reflectance coefficient times said window transmission coefficient times said lens transmission coefficient;
- said emission component of said lens times said window transmission coefficient times said mirror reflectance coefficient times said window transmission coefficient times said lens transmission coefficient;
- an emission component of said detector array at a cryogenic temperature times said lens transmission coefficient times said window transmission coefficient times said mirror reflectance coefficient times said window transmission coefficient times said lens transmission coefficient;

calculating an offset of said focal plane imager at said first point in time, where said offset is mathematically defined as follows, where m is equal to slope of said laboratory-generated calibration curve, x is an average of said count value, and y is equal to said in-band radiance value: offset=y−mx;

generating an adjusted calibration curve by adjusting said laboratory-generated calibration curve an amount equal to said offset; and assigning radiance values to count values of said digital imagery according to said adjusted calibration curve.

5. The method according to claim 4, wherein said predetermined distance of said mirror from said lens is about 8 inches.

6. The method according to claim 4, wherein said predetermined distance of said mirror from said lens is a range of about 1 inch to about 12 inches.

* * * * *